US008406779B2

(12) United States Patent
Jun et al.

(10) Patent No.: US 8,406,779 B2
(45) Date of Patent: Mar. 26, 2013

(54) METHOD AND SYSTEM FOR PROCESSING RESOURCE IN PROCESS OF CONNECTION MOBILITY MANAGEMENT

(75) Inventors: Huang Jun, Shenzhen (CN); Changjiang Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/381,736

(22) PCT Filed: Apr. 23, 2010

(86) PCT No.: PCT/CN2010/072143
§ 371 (c)(1),
(2), (4) Date: Dec. 30, 2011

(87) PCT Pub. No.: WO2011/003294
PCT Pub. Date: Jan. 13, 2011

(65) Prior Publication Data
US 2012/0100865 A1    Apr. 26, 2012

(30) Foreign Application Priority Data

Jul. 8, 2009    (CN) .......................... 2009 1 0088203

(51) Int. Cl.
*H04Q 7/20*    (2006.01)
(52) U.S. Cl. .................. 455/450; 455/452.1; 455/452.2; 370/329
(58) Field of Classification Search .................. 455/450, 455/452.1, 452.2; 370/329; 713/168
See application file for complete search history.

(56) References Cited

U.S. PATENT DOCUMENTS

| 2009/0168729 A1* | 7/2009 | Sun et al. ........................ 370/335 |
| 2010/0128646 A1* | 5/2010 | Gao .............................. 370/312 |
| 2010/0235634 A1* | 9/2010 | Fischer .......................... 713/168 |

FOREIGN PATENT DOCUMENTS

| CN | 1468013 A | 1/2004 |
| CN | 101605393 A | 12/2009 |
| WO | 2006018661 A2 | 2/2006 |

OTHER PUBLICATIONS

3GPP TS 25.331 V8.6.0 3rd Generation Partnership Project; Technical Specification Group Radio Access Network; Radio Resource Control(RRC); Protocol Specification (Release 8); Mar. 2009.
3GPP TR 25.922 V7.1.0 3rd Generation Partnership Project; Technical Specification Group Radio Access Network; Radio resource management strategies (Release 7); Mar. 2007.
International Search Report for PCT/CN2010/072143 dated Jun. 23, 2010.

* cited by examiner

*Primary Examiner* — Danh Le
(74) *Attorney, Agent, or Firm* — Ling Wu; Stephen Yang; Ling and Yang Intellectual Property

(57) ABSTRACT

The prevent invention discloses a method for processing resources in a process of connection mobility management. The method includes: a Radio Bearer Control (RBC) module receiving resource configuration related messages sent by a Connection Mobility Management (CMM) module and a network side, and configuring resources included in the resource configuration related messages. The prevent invention further provides a system for processing resources in a process of connection mobility management. Based on the method and system, processing procedures of the resources in the process of connection mobility management are simplified and the processing efficiency is improved.

17 Claims, 6 Drawing Sheets

METHOD AND SYSTEM FOR PROCESSING RESOURCE IN PROCESS OF CONNECTION MOBILITY MANAGEMENT

TECHNICAL FIELD

The present invention relates to the field of the 3rd generation mobile communication, and more particularly, to a method and a system for processing resources in a process of connection mobility management.

BACKGROUND OF THE RELATED ART

The Universal Mobile Telecommunication System (UMTS) is one of the 3rd Generation mobile communication systems, and its network structure is composed of a Center Network (CN), a UMTS Terrestrial Radio Access Network (UTRAN) and a User Equipment (UE). An interface Uu between the UTRAN and UE is a radio interface, on which a protocol stack is divided into a physical layer (the first layer), a data link layer (the second layer) and a network layer (the third layer) according to its functions and tasks. A Radio Resource Control (RRC) sub-layer, located in the bottom layer and belonging to the access layer, is mainly used to provide functions, such as control and management of radio resources and so on.

Radio bearer control and connection mobility management are two of very important functions of the RRC sub-layer. Since the time at which the two processes occur is not close, the two functions may be implemented respectively by a Radio Bearer Control (RBC) module and a Connection Mobility Management (CMM) module. The RBC module is mainly used to process a reconfiguration message sent by the network side, including messages such as radio bearer establishment, radio bearer reconfiguration, radio bearer release, transport channel reconfiguration and physical channel reconfiguration and so on. The RBC module is responsible for configuring resources included in these messages to the bottom layer such as the Radio Link Control (RLC) sub-layer of the data link layer, the Media Access Control (MAC) sub-layer and the physical layer and so on, such that a terminal and the upper layer of the network side can perform normal interaction of data and signaling services. The CMM module is mainly used to process handover in the same Radio Access Technology (RAT) mode, handover of different RAT modes, cell update and UTRAN Registration Area (URA) update and so on, which are caused by mobile and service requirements, where one URA may contain a plurality of CELLs. Various processes of the RBC and CMM modules are all performed when the RRC sub-layer is in a connected state. The connected state of the RRC sub-layer, i.e., the state of the UE includes four states: a CELL-Forward Access Channel (FACH) state, a CELL-Dedicated Channel (DCH) state, a CELL-Paging Channel (PCH) state and a URA-PCH state.

In the process of mobility management, the CMM module at the UE side generates a CELL update message to send to the network side; the network side receives the message, and then the UTRAN may send a CELL update confirmation message on the dedicated or common control channel. The cell update confirmation message may include access layer resources required for the UE side. The process of mobility management may be processes of mobile information update, physical channel reconfiguration, transport channel reconfiguration, radio bearer release or radio bearer reconfiguration and so on depending on different resources included in the cell update confirmation message.

If a URA update process requires initiating, the CMM module at the UE side is required to assemble a URA update request message to send to the network side. The network side receives the message, and then the UTRAN may send a URA update confirmation message on the dedicated control channel or the common channel. The process may also include the mobile information update of the UE.

The methods for processing various resource reconfiguration processes in the process of mobility management are similar to those for processing resource reconfiguration processes in the RBC module. In addition, processing of these resource reconfiguration processes is relatively complicated. If the processing of the CMM and RBC modules is separated completely, all of their own resource reconfiguration functions will be implemented respectively, thus increasing complexity of the function implementation and decreasing a processing efficiency.

SUMMARY OF THE INVENTION

In view of this, a main object of the present invention is to provide a method and a system for processing resources in a process of connection mobility management so as to simplify processing procedures of the resources in the process of connection mobility management and improve a processing efficiency.

In order to achieve the object described above, the technical scheme of the present invention is implemented as follows.

The present invention provides a method for processing resources in a process of connection mobility management comprising:

a Radio Bearer Control (RBC) module receiving resource configuration related messages sent by a Connection Mobility Management (CMM) module and a network side, and configuring resources included in the resource configuration related messages.

Further, the resource configuration related message sent by the CMM module is a resource configuration request message, and the resource configuration related message sent by the network side is a resource reconfiguration message.

Further, the RBC module receiving the resource configuration request message comprises:

the CMM module sending a cell update message to the network side;

the network side returning a cell update confirmation message to the CMM module based on the cell update message; and the CMM module generating the resource configuration request message based on the cell update confirmation message to send to the RBC module;

wherein the resource configuration request message includes resources requiring configuring in the cell update confirmation message; the resources requiring configuring are resources for radio bearer establishment, radio bearer reconfiguration, radio bearer release, physical channel reconfiguration, transport channel reconfiguration or mobile information update.

Further, the RBC module receiving the resource reconfiguration message comprises:

the network side generating the resource reconfiguration message to send to the RBC module;

wherein the resource reconfiguration message includes resources requiring configuring, which are the resources for radio bearer establishment, radio bearer reconfiguration, radio bearer release, physical channel reconfiguration, or transport channel reconfiguration.

Further, when the RBC receives the resource configuration related messages, the method further comprises:

the RBC module setting a resource process variable to indicate that configuration is being performed and configuring the resources included in the resource configuration related messages.

Further, when the RBC module completes the configuration of the resources, the method further comprises: the RBC module sending a resource configuration completion message to the network side.

Further, after the RBC module sending the resource configuration completion message to the network side, the method further comprises:

when the resource configuration related message is the resource configuration request message, the RBC module sending a resource configuration indication of configuration success to the CMM module and setting a resource process variable to denote that configuration is completed.

Further, after the RBC module sending the resource configuration completion message to the network side, the method further comprising:

when the resource configuration related message is the resource reconfiguration message, the RBC module setting a resource process variable to denote that configuration is completed.

The present invention further provides a system for processing resources in a process of connection mobility management, and the system comprises a terminal side RBC module and a message module; wherein the message module is configured to send a resource configuration related message to the terminal side RBC module; and the terminal side RBC module is configured to receive the resource configuration related message and configure resources included in the resource configuration related message.

Further, the message module comprises a terminal side CMM sub-module and a network side message sub-module; wherein the terminal side CMM sub-module is configured to send a cell update message to the network side message sub-module, receive a cell update confirmation message sent by the network side message sub-module, and generate a resource configuration request message as the resource configuration related message based on the cell update confirmation message to send to the terminal side RBC module; and the network side message sub-module is configured to send a resource reconfiguration message as the resource configuration related message to the terminal side RBC module, receive the cell update message sent by the terminal side CMM sub-module, and return the cell update confirmation message to the terminal side CMM sub-module.

Further, the terminal side RBC module is further configured to send a resource configuration completion message to the network side message sub-module when configuration of the resources is completed and, after sending the resource configuration completion message, send a resource configuration indication of configuration success to the terminal CMM sub-module if the resource configuration message is the resource configuration request message; and accordingly, the terminal side CMM sub-module is further configured to receive the resource configuration indication of configuration success sent by the terminal RBC module.

In the resource processing scheme of the present invention, the same portions in the resource configuration process of the CMM module and the resource configuration process of the RBC module, such as radio bearer reconfiguration, radio bearer release, physical channel reconfiguration and transport channel reconfiguration, are processed by the RBC module uniformly; and the CMM module is only responsible for sending the messages including resources to the RBC module. Thus, the processing procedure of the CMM module in the resource configuration process is simplified. In addition, since the RBC module itself has the capability of performing resource configuration described above, the resource configuration process of the CMM module being performed by the RBC module will not increase processing burden of the RBC module, thereby improving the efficiency of processing resource configuration at the UE side.

PREFERRED EMBODIMENTS OF THE PRESENT INVENTION

The technical scheme of the present invention will be further described in detail in conjunction with the accompanying figures and particular embodiments.

In the present invention, the same portions in a resource configuration process of a CMM module and a resource configuration process of a RBC module, such as radio bearer reconfiguration, radio bearer release, physical channel reconfiguration and transport channel reconfiguration, are processed by the RBC module uniformly. In addition, a mobile information update process of the CMM module is processed by the RBC module as well. The CMM module is only responsible for interacting messages with the network side.

It should be noted that both the CMM module and the RBC module in the present refer to the CMM module and the RBC module at the UE side.

Figure 1:
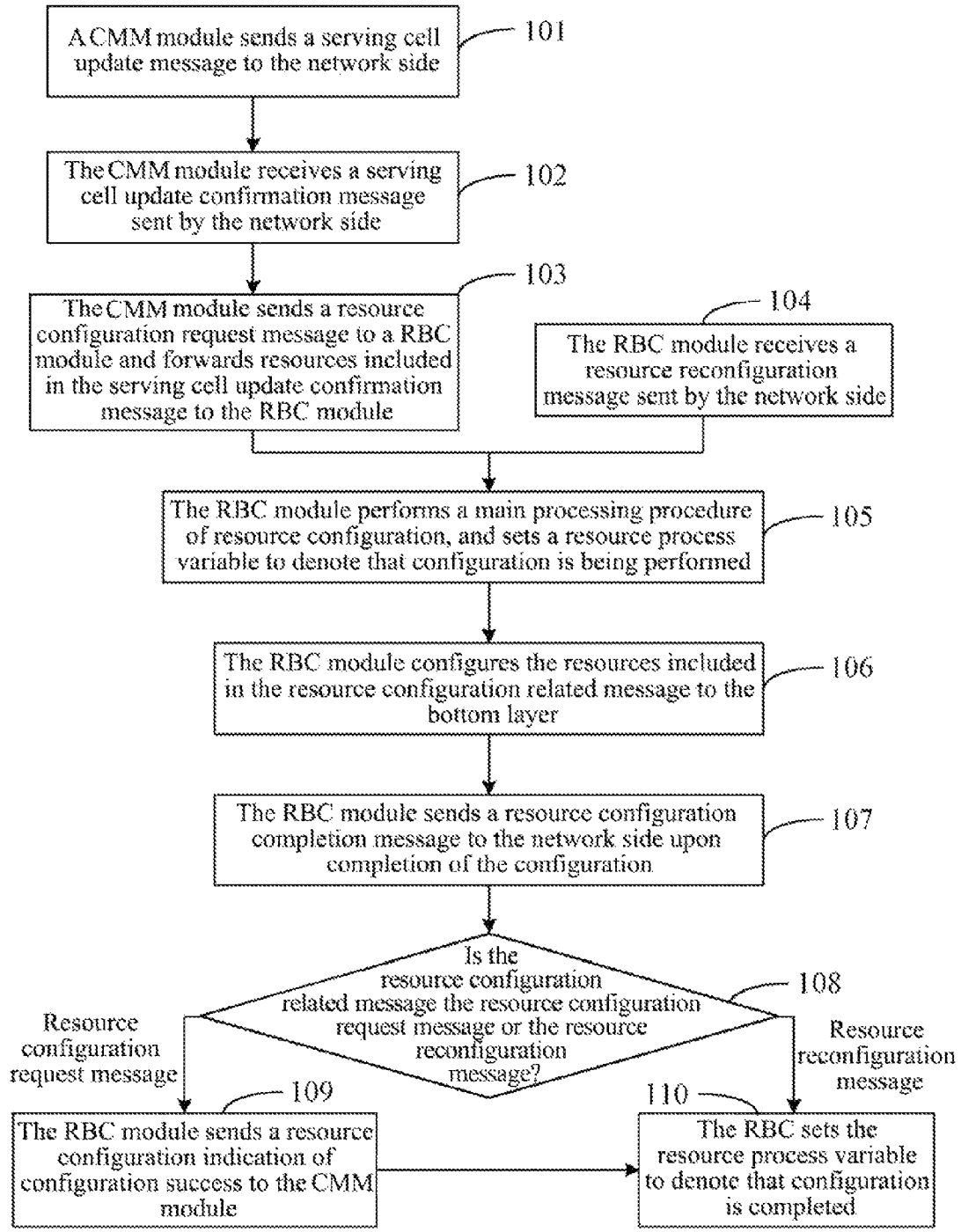
FIG. 1 is a flow chart of a method for processing resources in a process of connection mobility management in accordance with an embodiment of the present invention.

FIG. 1 is a flow chart of a method for processing resources in a process of connection mobility management in accordance with the present invention, and the method comprises the following steps.

Step 101, a CMM module sends a cell update message to the network side.

Step 102, the CMM module receives a cell update confirmation message sent by the network side.

Step 103, the CMM module sends a resource configuration request message to a RBC module and forwards resources included in the cell update confirmation message to the RBC module, and then step 105 is performed.

Step 104, the RBC module receives a resource reconfiguration message sent by the network side.

Step 105, the RBC module performs a main processing procedure of resource configuration, and sets a resource process variable to denote that configuration is being performed.

Step 106, the RBC module configures the resources included in the resource configuration related message to the bottom layer.

Step 107, the RBC module sends a resource configuration completion message to the network side upon completion of the configuration.

Step 108, it is judged whether the resource configuration related message is the resource configuration request message or the resource reconfiguration message, and if it is the resource configuration request message, step 109 is performed; if it is the resource reconfiguration message, step 110 is performed.

Step 109, the RBC module sends a resource configuration indication of configuration success to the CMM module, and then step 110 is performed.

Step 110, the RBC module sets the resource process variable to denote that configuration is completed.

The scheme of the present invention will be described below in conjunction with the particular embodiments.

Figure 2:
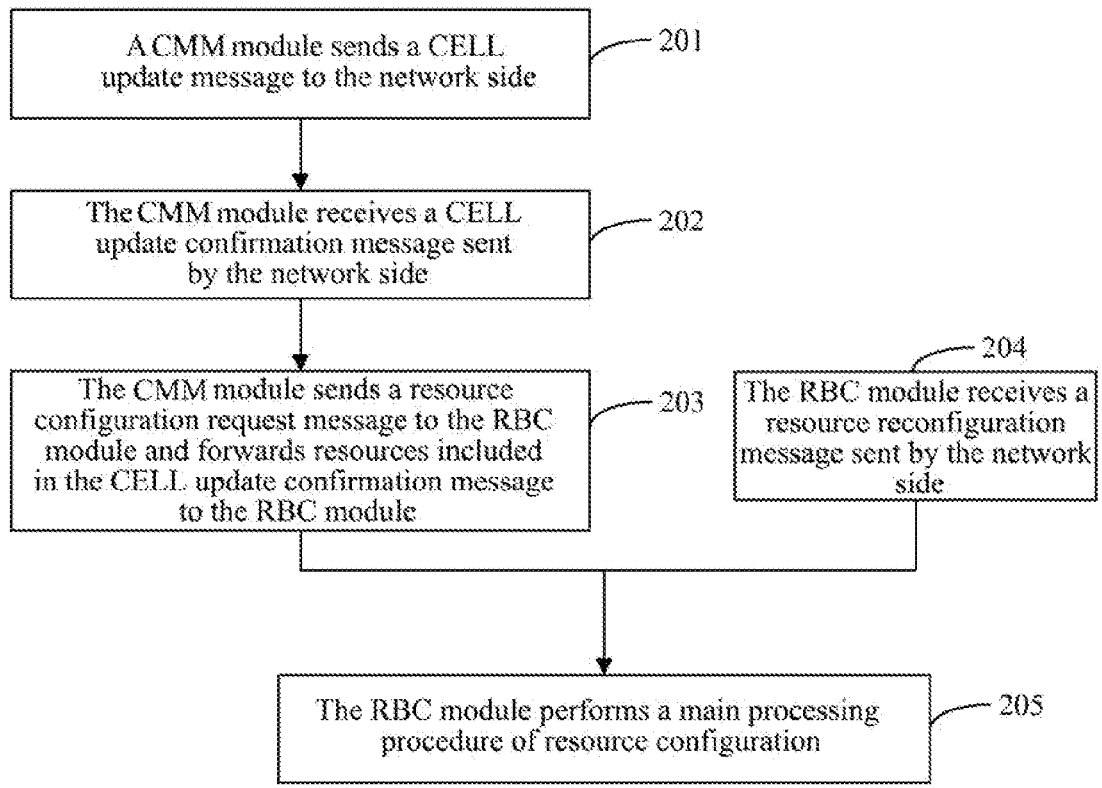
FIG. 2 is a flow chart of a procedure in which a RBC module receives a resource configuration related message in accordance with an embodiment of the present invention.

When configuring resources, the RBC module of the present invention is required to configure resources based on two types of resource configuration related messages, one being the resource configuration request message sent by the CMM module to the RBC module in the CELL or URA update process, the other being the resource reconfiguration message sent by the network side. The processing in the CELL update process is the same as that in the URA update process. The present invention takes the CELL update process as an example to describe a procedure in which a RBC module receives a resource configuration related message in accordance with the present invention. As shown in FIG. 2, the procedure comprises the following steps.

Step 201, a CMM module sends a CELL update message to the network side.

Step 202, the CMM module receives a CELL update confirmation message sent by the network side.

Step 203, the CMM module sends a resource configuration request message to the RBC module and forwards resources included in the CELL update confirmation message to the RBC module.

Steps 201 to 204 are the procedure in which the CMM module sends the resource configuration request message to the RBC module. The CMM module sends the CELL update message to the network side in the process of connection mobility management, and the network side sends the CELL update confirmation message to the CMM module based on the update message. The CMM module generates the resource configuration request message including resources requiring configuring in the CELL update confirmation message to send to the RBC module after receiving the CELL update confirmation message. Thus, the CMM module forwards the resources requiring configuring to the RBC module and then step 205 is performed, in which the RBC module performs a main processing procedure of resource configuration.

Step 204, the RBC module receives a resource reconfiguration message sent by the network side.

The RBC module receives the resource reconfiguration message actively sent by the network side, and the resource reconfiguration message indicates that the RBC module is required to perform one of five reconfiguration processes: radio bearer establishment, radio bearer reconfiguration, radio bearer release, transport channel reconfiguration and physical channel reconfiguration processes.

Then, the RBC module performs the main processing procedure of resource configuration for resources included in the resource reconfiguration message.

Step 205, the RBC module performs a main process procedure of resource configuration.

It should be noted that the CMM module is required to send a URA update message to the network side in the URA update process; and the network side sends a URA update confirmation message to the CMM module based on the update message. In the present invention, both the URA update message and the CELL update message are called as the cell update message, and both the URA update confirmation message and the CELL update confirmation message are called as the cell update confirmation message.

Since the cell update process is processed under a CELL-FACH state, the main processing procedure of the resources in the process of transitions from the CELL-FACH state to the CELL-FACH state, from the CELL-FACH state to the CELL-DCH state and from the CELL-FACH state to the CELL-PCH state will be described through specific embodiments of the present invention.

It should be noted that in the CELL update process, the CMM module receives the CELL update confirmation message indicating that a UE is transformed from the current CELL-FACH state to a destination state, i.e., the CELL-FACH state, CELL-DCH state, or CELL-PCH state; and the RBC module receives the resource reconfiguration message sent by the network side indicating that the UE is transformed from the current CELL-FACH state to a destination state, i.e., the CELL-FACH state, CELL-DCH state, or CELL-PCH state.

Figure 3:
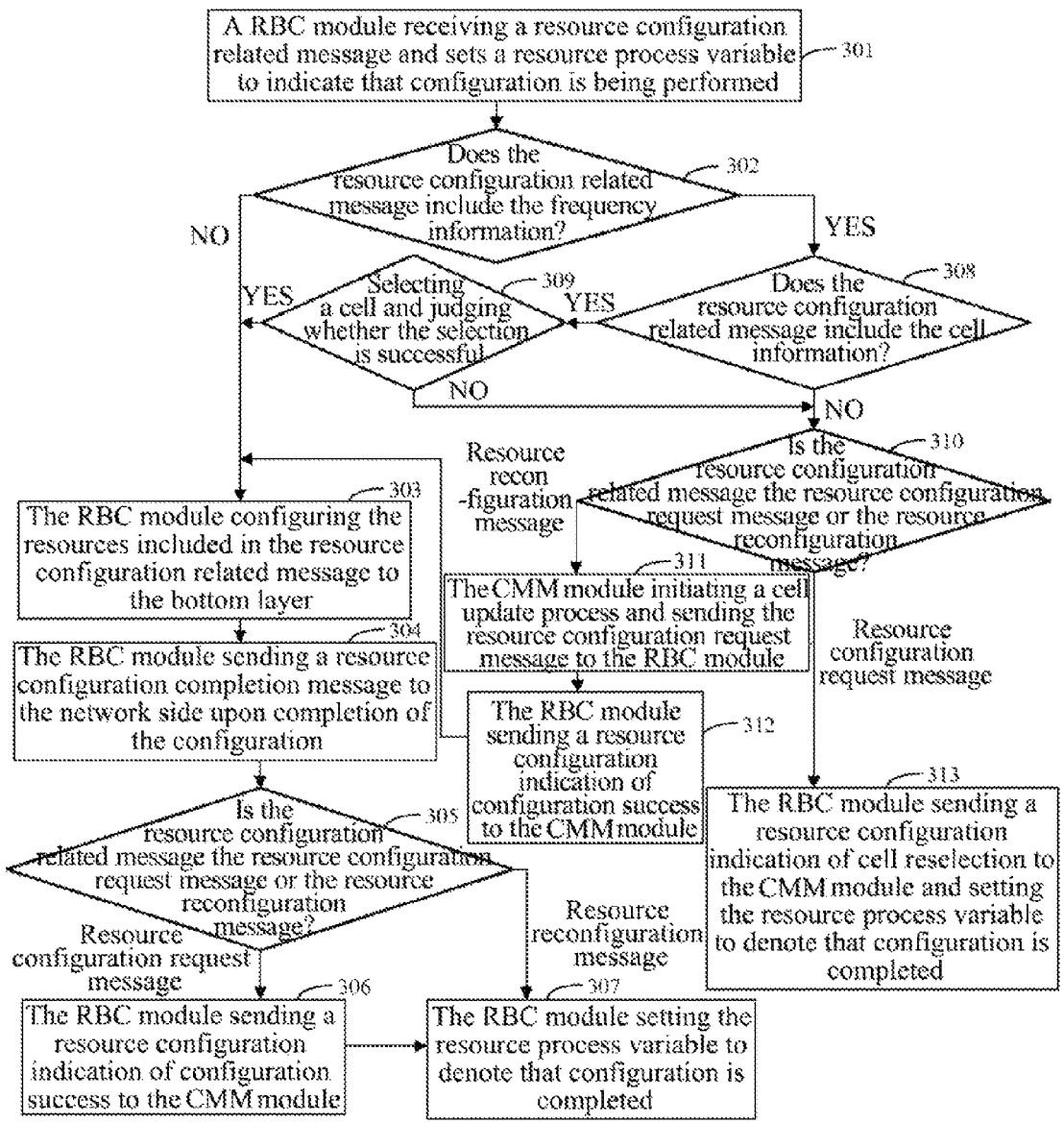
FIG. 3 is a flow chart of a method for processing resources in a process of the transition from a CELL-FACH state to a CELL-FACH state in accordance with an embodiment of the present invention.

FIG. 3 is a flow chart of a method for processing resources in a process of the transition of a UE from a CELL-FACH state to a CELL-FACH state in accordance with an embodiment of the present invention comprising the following steps.

Step 301, a RBC module receives a resource configuration related message and sets a resource process variable to denote that configuration is being performed.

The RBC module receives the resource configuration related message, such as a resource configuration request message or a resource reconfiguration message, then the RBC module performs the main processing procedure of resource configuration, in which it needs first to set the resource process variable OrderedRecfg to denote that configuration is being performed. Preferably, the value of Orderdrecfg may be set to True to denote that resource configuration is being performed.

Step 302, it is judged whether the resource configuration related message includes frequency information, if not, step 303 is performed; if yes, step 308 is performed.

The frequency information may be working frequency, to which the UE may be handed over. If the resource configuration related message does not include the frequency information, it is represented that there is no working frequency to which the UE may be handed over, then the UE is still working at the current working frequency, and step 303 is performed; if the resource configuration related message includes the frequency information, then there is a working frequency to which the UE may be handed over, and step 308 is performed.

Step 303, the RBC module configures the resources included in the resource configuration related message to the bottom layer.

In this step, resource configuration performed by the RBC module may be radio bearer establishment, radio bearer reconfiguration, radio bearer release, physical channel reconfiguration, transport channel reconfiguration or mobile information update. It should be noted that resource configuration processes of radio bearer establishment, radio bearer reconfiguration, radio bearer release, physical channel reconfiguration and transport channel reconfiguration may be performed by the CMM module or the RBC module in the related art. However, in the present invention, the resource configuration processes that can be performed by both the CMM module and the RBC module are all performed by the RBC module uniformly. In addition, the resource configuration process of mobile information update that can be performed by the CMM module only in the related art is also performed by the RBC module in the present invention.

If the resource configuration related message is a resource configuration request message, the resource configuration performed by the RBC module may be radio bearer establishment, radio bearer reconfiguration, radio bearer release, physical channel reconfiguration, transport channel reconfiguration or mobile information update.

If the resource configuration related message is a resource reconfiguration message, the resource configuration performed by the RBC module may be radio bearer establishment, radio bearer reconfiguration, radio bearer release, physical channel reconfiguration, or transport channel reconfiguration.

The specific resource configuration processes are existing processing methods and will not be repeated herein.

Step 304, the RBC module sends a resource configuration completion message to the network side upon completion of the configuration.

The RBC module sends the resource configuration completion message to the network side through the bottom layer and receives the confirmation that the resource configuration completion message is sent successfully returned by the bottom layer.

Step 305, it is judged whether the resource configuration related message is the resource configuration request message or the resource reconfiguration message, and if it is the resource configuration request message, step 306 is performed; if it is the resource reconfiguration message, step 307 is performed.

The judgment in this step is substantially judgment of whether resource configuration performed by the RBC module currently is resource configuration of the CMM module or resource configuration of the RBC module itself.

Specifically, according to the embodiment shown in FIG. 2, when the CMM module sends the resource configuration request message to the RBC module, preferably, a flag may be set to denote that the resource configuration related message is the resource configuration request message. The same processing way may be used for the resource reconfiguration message.

Step 306, the RBC module sends a resource configuration indication of configuration success to the CMM module.

Since the resource configuration performed by the RBC module is the resource configuration of the CMM module, the RBC module is required to set the cause value of the resource configuration indication ResourceCfgInd to denote that configuration is successful to send to the CMM module so as to notify the CMM module that the resource configuration is successful.

Step 307, the RBC module sets the resource process variable to denote that configuration is completed.

When the resource configuration performed by the RBC module currently is its own resource configuration, or the resource configuration of the CMM module performed by the RBC module in step 306 is successful, the RBC module sets the resource process variable to False to denote that the current resource configuration process is completed.

Step 308, it is judged whether the resource configuration related message includes cell information, and if yes, step 309 is performed; if not, step 310 is performed.

The cell information may be identity information of a cell, to which the UE may be handed over.

Step 309, a cell is selected and it is judged whether the selection is successful, and if yes, step 303 is returned; if not, step 310 is performed.

If both the frequency information and the cell information are included in the resource configuration related message, the UE can confirm a cell based on both information and be handed over to the cell from the current cell and returns to step 303; if the resources configuration related message only includes the frequency information without the cell information, and because there may be a plurality of cells in one frequency, the UE is unable to confirm a cell and then resides in the current cell, and step 310 is performed.

The specific handover of the UE between cells is existing processing method and will not be repeated herein.

Step 310, it is determined whether the resource configuration related message is the resource configuration request message or the resource reconfiguration message, if it is the resource reconfiguration message, step 311 is performed; if it is the resource configuration request message, step 313 is performed.

The processing in this step is the same as that in step 305 and will not be repeated herein.

Step 311, the CMM module initiates a cell update process and sends the resource configuration request message to the RBC module.

If the resources configuration related message includes the frequency information without the cell information and the resource configuration related message is the resource reconfiguration message, a cell selection module of the UE selects a suitable cell according to the environment where it is situated, and then the RBC module sends a CELL update request with the cause value being cell reselection to the CMM module. The CMM module initiates the cell update process as shown in steps 201 to 203 in FIG. 2 regarding to the cell selected by the cell selection module based on the CELL update request. It should be noted that the CMM module receives the CELL update confirmation message resource configuration process in the cell update process in this step, and thus this message does not include any resource requiring configuring.

Step 312, the RBC module sends a resource configuration indication of configuration success to the CMM module.

Since the CELL update confirmation message obtained by the CMM module in step 311 does not include any resource requiring configuring, when the RBC module receives the resource configuration request message sent by the CMM module, it immediately returns a resource configuration indication with the cause value being configuration success by default to the CMM module, and returns to step 303.

Step 313, the RBC module sends a resource configuration indication of cell reselection to the CMM module and sets the resource process variable to denote that configuration is completed.

Since the current resource configuration related message is the resource configuration request message, that is, the resource configuration performed by the RBC module currently is the resource configuration of the CMM module, when cell selection is failed, or when only the frequency information not the cell information is included in the resources configuration related message, the RBC module sends a resource configuration indication with the cause value being cell reselection to the CMM module and sets the resource process variable to denote that configuration is completed. At this point, the CMM module performs the cell update process shown in FIG. 2 again.

Figure 4:
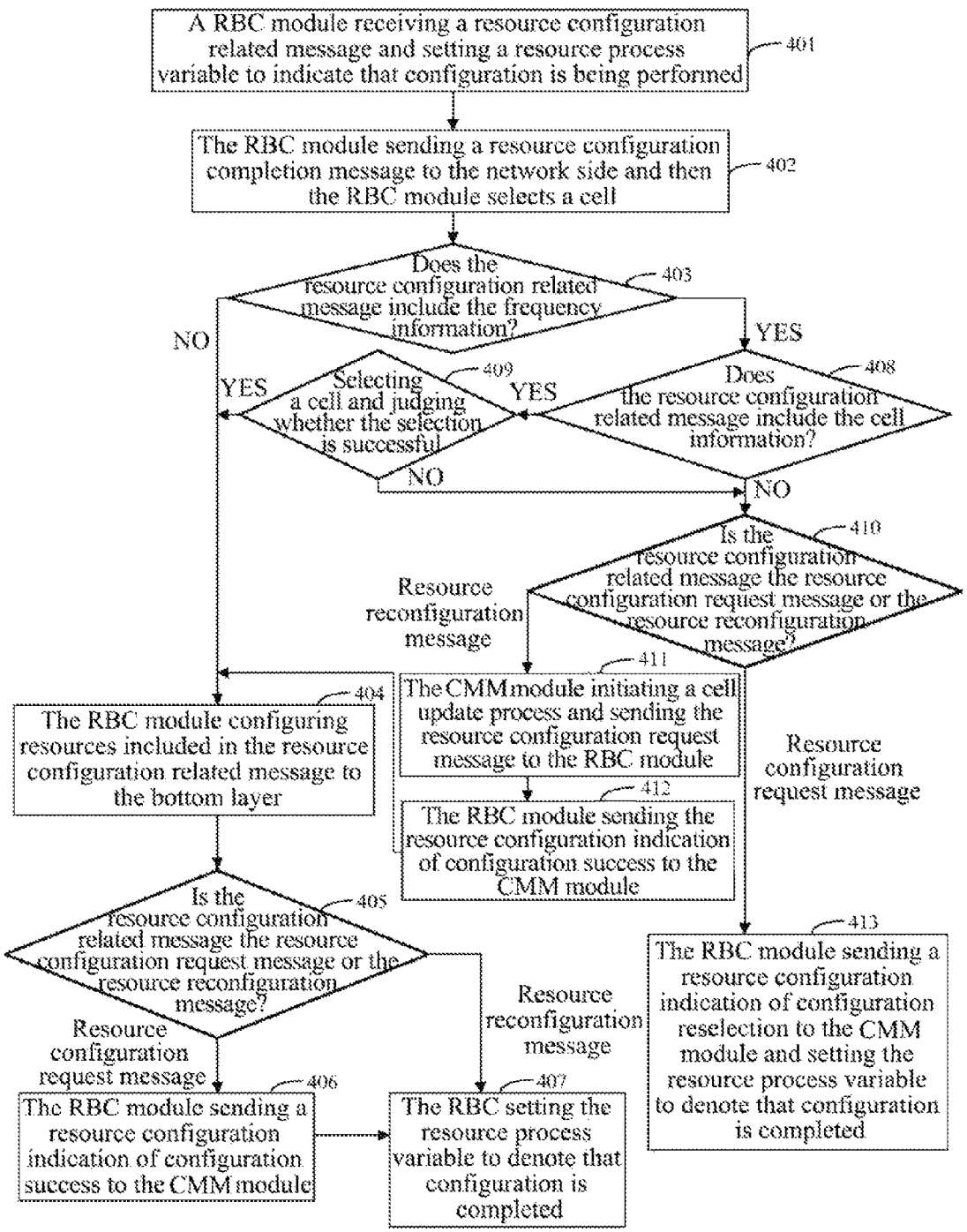
FIG. 4 is a flow chart of a method for processing resources in a process of the transition from a CELL-FACH state to a CELL-PCH state in accordance with an embodiment of the present invention.

FIG. 4 is a flow chart of a method for processing resources in a process of the transition from a CELL-FACH state to a CELL-PCH state in accordance with an embodiment of the present invention comprising the following steps.

Step 401, a RBC module receives a resource configuration related message and sets a resource process variable to indicate that configuration is being performed.

The processing in this step is the same as that in step 301 and will not be repeated herein.

Step 402, the RBC module selects a cell after sending a resource configuration completion message to the network side.

When a UE is in a CELL-PNC state, the RBC module cannot send messages to the network side in the resource configuration process. Thus, before configuring resources to the bottom layer, for a resource reconfiguration message sent by the network side, the RBC module first returns a resource configuration completion message to the network side by default and then selects the cell, and step 403 is performed.

Step 403, it is judged whether the resource configuration related message includes the frequency information, and if not, step 404 is performed; if yes, step 408 is performed.

Step 404, the RBC module configures resources included in the resource configuration related message to the bottom layer.

In this step, the RBC module does not return the resource configuration completion message to the network side but performs step 405 upon completion of resource configuration.

Step 405, it is judged whether the resource configuration related message is the resource configuration request message or the resource reconfiguration message, and if it is the resource configuration request message, step 406 is performed; if it is the resource reconfiguration message, step 407 is performed.

Step 406, the RBC module sends a resource configuration indication of configuration success to the CMM module.

Step 407, the RBC sets the resource process variable to denote that configuration is completed.

Step 408, it is judged whether the resource configuration related message includes cell information, and if yes, step 409 is performed; if not, step 410 is performed.

Step 409, a cell is selected and it is judged whether the selection is successful, and if yes, step 404 is returned; if not, step 410 is performed.

Step 410, it is judged whether the resource configuration related message is the resource configuration request message or the resource reconfiguration message, and if it is the resource reconfiguration message, step 411 is performed; if it is the resource configuration request message, step 413 is performed.

Step 411, the CMM module initiates a cell update process and sends the resource configuration request message to the RBC module.

Step 412, the RBC module sends the resource configuration indication of configuration success to the CMM module.

Step 413, the RBC module sends a resource configuration indication of configuration reselection to the CMM module and sets the resource process variable to denote that configuration is completed.

The processing in steps 405 to 413 is the same as that in steps 305 to 313 and will not be repeated herein.

Figure 5:
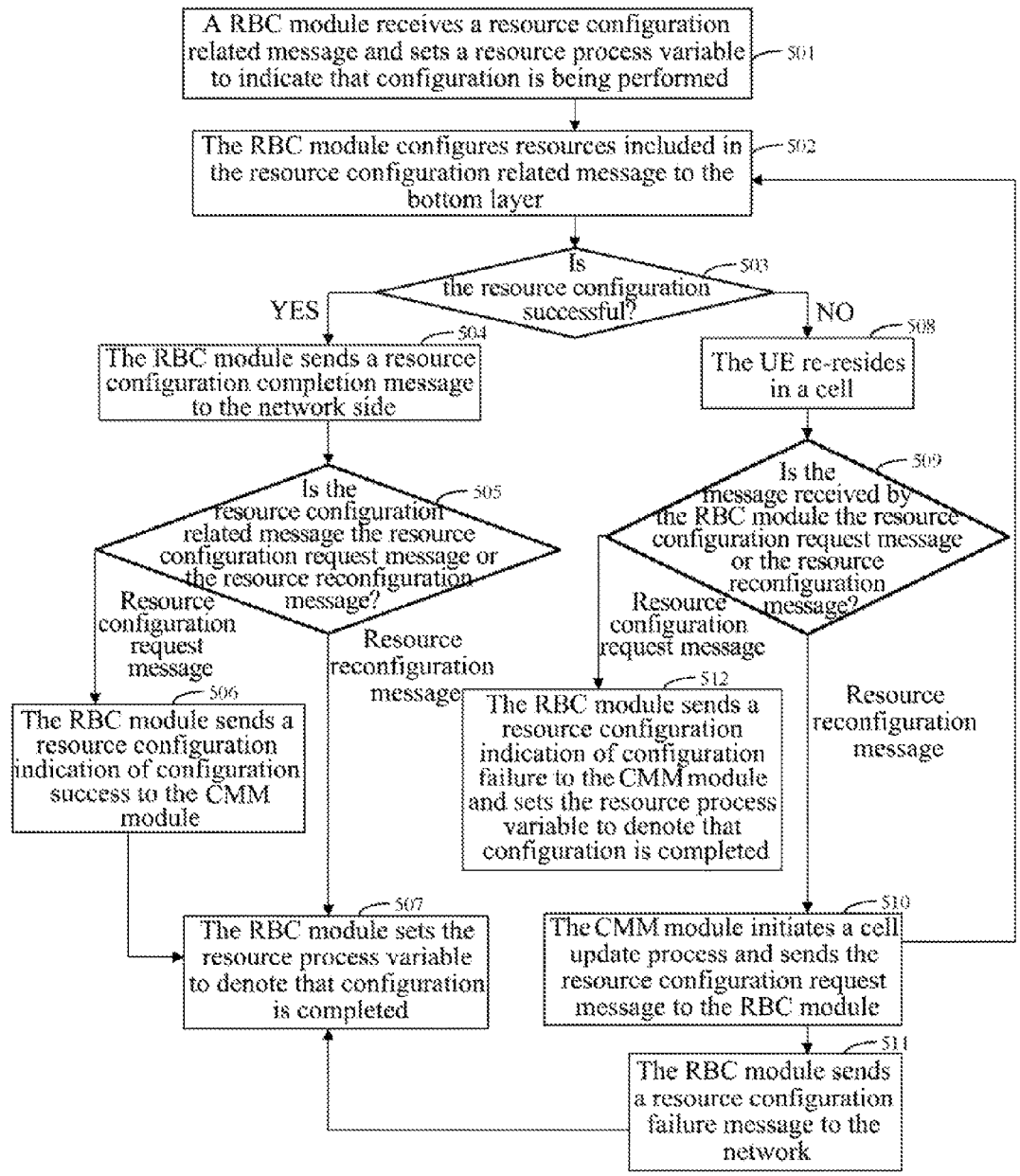
FIG. 5 is a flow chart of a method for processing resources in a process of the transition from a CELL-FACH state to a CELL-DCH state in accordance with an embodiment of the present invention.

FIG. 5 is a flow chart of a method for processing resources in the process of the transition from a CELL-FACH state to a CELL-DCH state in accordance with an embodiment of the present invention comprising the following steps.

Step 501, a RBC module receives a resource configuration related message and sets a resource process variable to indicate that configuration is being performed.

The processing in this step is the same as that in step 301 and will not be repeated herein.

Step 502, the RBC module configures resources included in the resource configuration related message to the bottom layer.

In this procedure, when the RBC module receives the resource configuration related message, it configures the resources included in this message to the bottom layer. In this procedure, the state of a UE is transformed from a CELL-FACH state to a CELL-DCH state, and thus, the resources included in the resource configuration related message are related resources of the DCH. The resource configuration is configuration of the DCH, specific implementation of which is known in the related art and will not be repeated herein.

Step 503, it is judged whether the resource configuration is successful, and if yes, step 504 is returned; if not, step 508 is performed.

In this step, the judgment of whether the resource configuration is successful is known in the related art and will not be repeated herein.

Step 504, the RBC module sends a resource configuration completion message to the network side.

Upon completion of the configuration, the RBC module sends the resource configuration completion message to the network side through the bottom layer and receives the confirmation that the message resource configuration completion is sent successfully returned by the bottom layer.

Step 505, it is judged whether the resource configuration related message is the resource configuration request message or the resource reconfiguration message, and if it is the resource configuration request message, step 506 is performed; if it is the resource reconfiguration message, step 507 is performed.

The judgment in this step is substantially the judgment of whether resource configuration performed by the RBC module currently is resource configuration of the CMM module or resource configuration of the RBC module itself.

The specific processing in this step is the same as that in step 305 and will not be repeated herein.

Step 506, the RBC module sends a resource configuration indication of configuration success to the CMM module.

The processing in this step is the same as that in step 306 and will not be repeated herein.

Step 507, the RBC module sets the resource process variable to denote that the configuration is completed.

The processing in this step is the same as that in step 307 and will not be repeated herein.

Step 508, the UE re-resides in a cell.

When the resource configuration is determined to be failed, the UE reselects a cell according to its own requirements and resides in this cell.

Step 508, it is judged whether the resource configuration related message is the resource configuration request message or the resource reconfiguration message, and if it is the resource reconfiguration message, step 510 is resource reconfiguration message performed; if it is the resource configuration request message, step 512 is performed.

Step 510, the CMM module initiates a cell update process and sends the resource configuration request message to the RBC module.

When the resource configuration is failed and after the UE re-resides in a cell, the RBC module sends a CELL update request with the cause value being cell reselection to the CMM module. The CMM module initiates the cell update process based on the CELL update request, as shown in steps 201 to 203. The RBC module reconfigures resources included in the resource configuration request message and returns to step 502 after receiving this resource configuration request message of the CMM module.

Step 511, the RBC module sends a resource configuration failure message to the network.

Since resource configuration of the DCH is failed, the RBC module sends a resource configuration failure message to the network side while reconfiguring resources, and then performs step 307, the procedure ends.

Step 512, the RBC module sends a resource configuration indication of configuration failure to the CMM module and sets the resource process variable to denote that the configuration is completed.

When the resource configuration of the DCH is failed, and if the resource configuration related message is the resource configuration request message, the RBC module sends the resource configuration indication of configuration failure to the CMM module and sets the resource process variable to denote that the configuration is completed.

Figure 6:
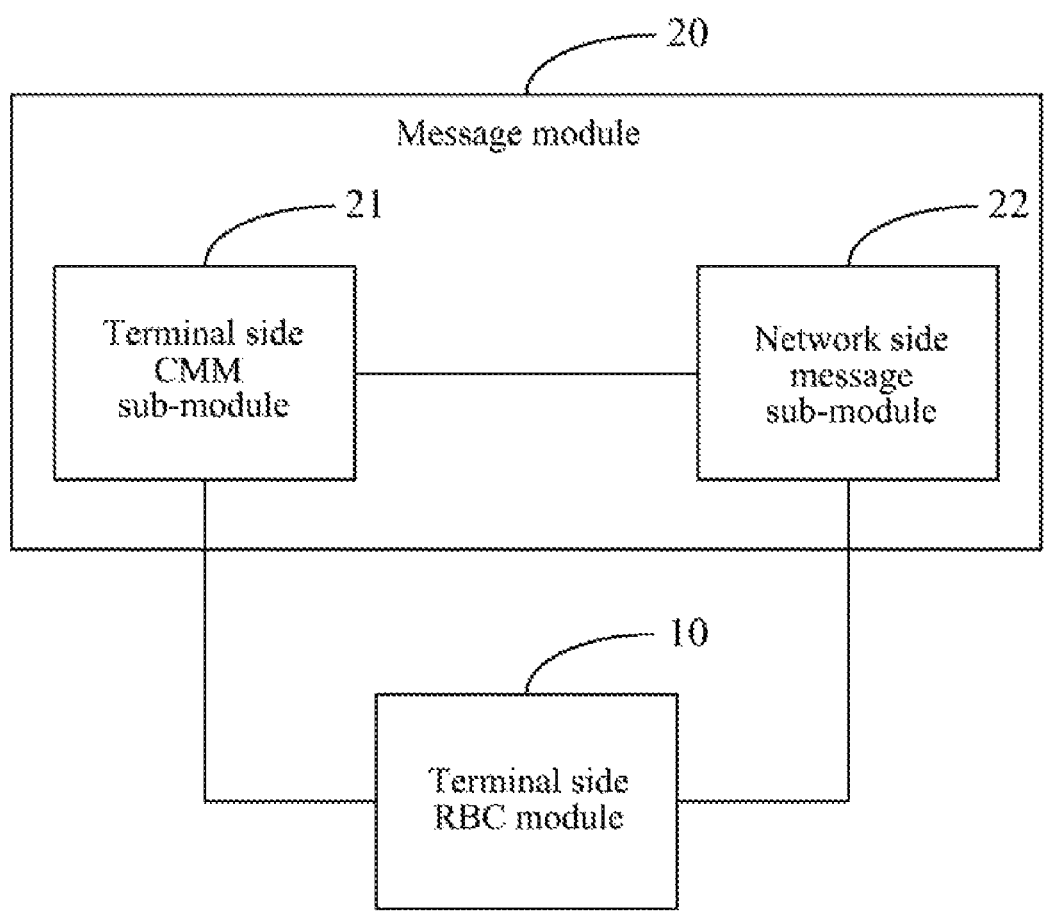
FIG. 6 is a block diagram of a system for processing resources in a process of connection mobility management in accordance with an embodiment of the present invention.

In order to implement the methods for processing resources described above, the present invention further provides a system for processing resources. As shown in FIG. 6, the system comprises a terminal side RBC module 10 and a message module 20.

The message module 20 is configured to send a resource configuration related message to the terminal side RBC module 10.

The terminal side RBC module 10 is configured to receive the resource configuration related message and configure resources included in the resource configuration related message.

Further, the message module 20 of the system may comprise a terminal side CMM sub-module 21 and a network side message sub-module 22.

The terminal side CMM sub-module 21 is configured to send a cell update message to the network side message sub-module 22, receive a cell update confirmation message sent by the network side message sub-module 22, and generate a resource configuration request message as the resource configuration related message based on the cell update confirmation message to send to the terminal side RBC module 10.

The network side message sub-module 22 is configured to send a resource reconfiguration message as the resource configuration related message to the terminal side RBC module 10, receive the cell update message sent by the terminal side CMM sub-module 21 and return the cell update confirmation message to the terminal side CMM sub-module 21.

The terminal side RBC module 10 is further configured to send a resource configuration completion message to network side message sub-module 22 when configuration of the resources is completed and, after sending the resource configuration completion message, send a resource configuration indication of configuration success to the terminal CMM sub-module 21 if the resource configuration message is the resource configuration request message.

Accordingly, the terminal side CMM sub-module 21 is further configured to receive the resource configuration indication of configuration success sent by the terminal RBC module 10.

The above description is the preferred embodiments of the present invention only and is not intended to limit the protection scope of the present invention.

What is claimed is:

1. A method for processing resources in a process of connection mobility management comprising:
 a Radio Bearer Control (RBC) module receiving resource configuration related messages sent by a Connection Mobility Management (CMM) module and a network side, wherein the resource configuration related message sent by the CMM module is a resource configuration request message, and the resource configuration related message sent by the network side is a resource reconfiguration message; and
 configuring resources included in the resource configuration related messages;
 wherein the RBC module receiving the resource configuration request message comprises:
 the CMM module sending a cell update message to the network side;
 the network side returning a cell update confirmation message to the CMM module based on the cell update message; and
 the CMM module generating the resource configuration request message based on the cell update confirmation message to send to the RBC module;
 wherein the resource configuration request message includes resources requiring configuring in the cell update confirmation message; the resources requiring configuring are
 resources for radio bearer establishment, radio bearer reconfiguration, radio bearer release, physical channel reconfiguration, transport channel reconfiguration or mobile information update.

2. The method according to claim 1, wherein the RBC module receiving the resource reconfiguration message comprises:
 the network side generating the resource reconfiguration message to send to the RBC module;
 wherein the resource reconfiguration message includes resources requiring configuring, which are the resources for radio bearer establishment, radio bearer reconfiguration, radio bearer release, physical channel reconfiguration, or transport channel reconfiguration.

3. The method according to claim 1, when the RBC receives the resource configuration related messages, the method further comprising:
 the RBC module setting a resource process variable to indicate that configuration is being performed and configuring the resources included in the resource configuration related messages.

4. The method according to claim 3, when the RBC module completes the configuration of the resources, the method further comprising: the RBC module sending a resource configuration completion message to the network side.

5. The method according to claim 4, after the RBC module sending the resource configuration completion message to the network side, the method further comprising:
 when the resource configuration related message is the resource configuration request message, the RBC module sending a resource configuration indication of configuration success to the CMM module and setting the resource process variable to denote that configuration is completed.

6. The method according to claim 4, after the RBC module sending the resource configuration completion message to the network side, the method further comprising:
when the resource configuration related message is the resource reconfiguration message, the RBC module setting the resource process variable to denote that configuration is completed.

7. The method according to claim 1, when the RBC module completes the configuration of the resources, the method further comprising: the RBC module sending a resource configuration completion message to the network side.

8. The method according to claim 7, after the RBC module sending the resource configuration completion message to the network side, the method further comprising:
when the resource configuration related message is the resource configuration request message, the RBC module sending a resource configuration indication of configuration success to the CMM module and setting a resource process variable to denote that configuration is completed.

9. The method according to claim 7, after the RBC module sending the resource configuration completion message to the network side, the method further comprising:
when the resource configuration related message is the resource reconfiguration message, the RBC module setting a resource process variable to denote that configuration is completed.

10. The method according to claim 1, when the RBC module completes the configuration of the resources, the method further comprising: the RBC module sending a resource configuration completion message to the network side.

11. The method according to claim 10, after the RBC module sending the resource configuration completion message to the network side, the method further comprising:
when the resource configuration related message is the resource configuration request message, the RBC module sending a resource configuration indication of configuration success to the CMM module and setting a resource process variable to denote that configuration is completed.

12. The method according to claim 10, after the RBC module sending the resource configuration completion message to the network side, the method further comprising:
when the resource configuration related message is the resource reconfiguration message, the RBC module setting a resource process variable to denote that configuration is completed.

13. The method according to claim 1, when the RBC module completes the configuration of the resources, the method further comprising: the RBC module sending a resource configuration completion message to the network side.

14. The method according to claim 13, after the RBC module sending the resource configuration completion message to the network side, the method further comprising:
when the resource configuration related message is the resource configuration request message, the RBC module sending a resource configuration indication of configuration success to the CMM module and setting a resource process variable to denote that configuration is completed.

15. The method according to claim 13, after the RBC module sending the resource configuration completion message to the network side, the method further comprising:
when the resource configuration related message is the resource reconfiguration message, the RBC module setting a resource process variable to denote that configuration is completed.

16. A system for processing resources in a process of connection mobility management comprising a terminal side RBC module and a message module; wherein
the message module is configured to send a resource configuration related message to the terminal side RBC module; and
the terminal side RBC module is configured to receive the resource configuration related message and configure resources included in the resource configuration related message;
wherein the message module comprises a terminal side CMM sub-module and a network side message sub-module; wherein
the terminal side CMM sub-module is configured to send a cell update message to the network side message sub-module, receive a cell update confirmation message sent by the network side message sub-module, and generate a resource configuration request message as the resource configuration related message based on the cell update confirmation message to send to the terminal side RBC module; and
the network side message sub-module is configured to send a resource reconfiguration message as the resource configuration related message to the terminal side RBC module, receive the cell update message sent by the terminal side CMM sub-module, and return the cell update confirmation message to the terminal side CMM sub-module.

17. The system according to claim 16, wherein
the terminal side RBC module is further configured to send a resource configuration completion message to the network side message sub-module when configuration of the resources is completed and, after sending the resource configuration completion message, send
a resource configuration indication of configuration success to the terminal CMM sub-module if the resource configuration message is the resource configuration request message; and
accordingly, the terminal side CMM sub-module is further configured to receive the resource configuration indication of configuration success sent by the terminal RBC module.

* * * * *